United States Patent Office 3,354,342
Patented Nov. 21, 1967

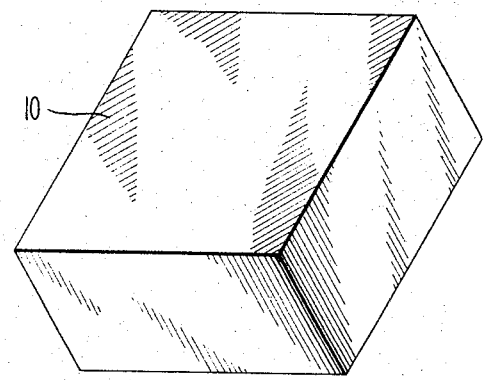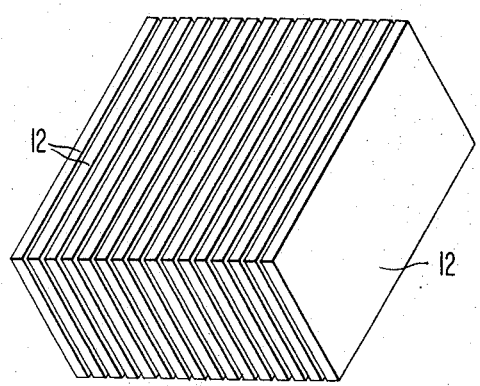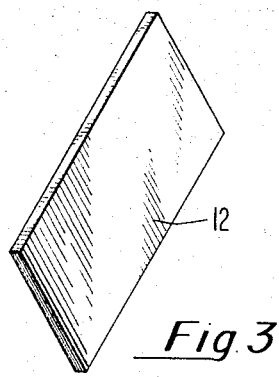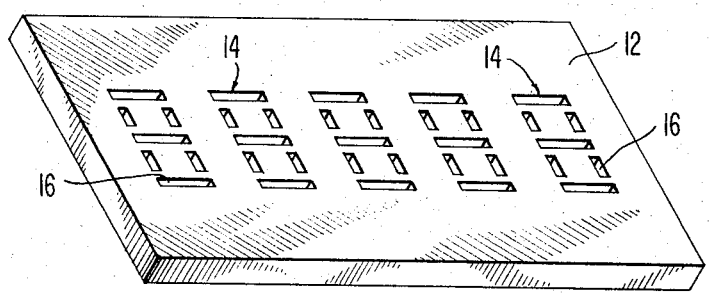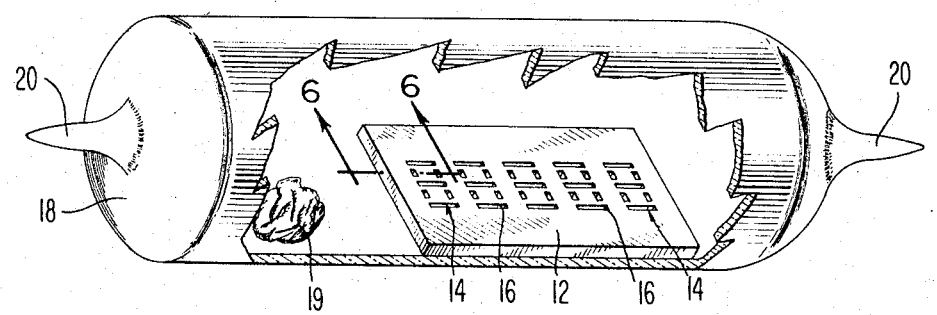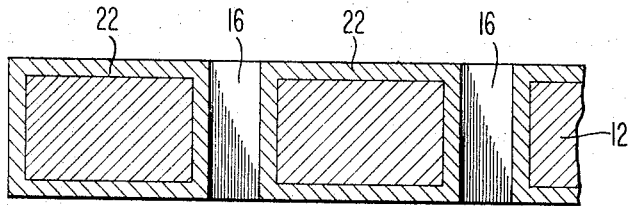

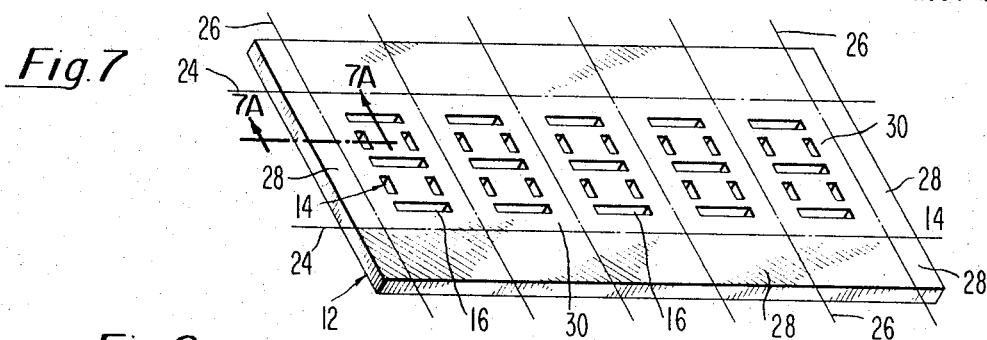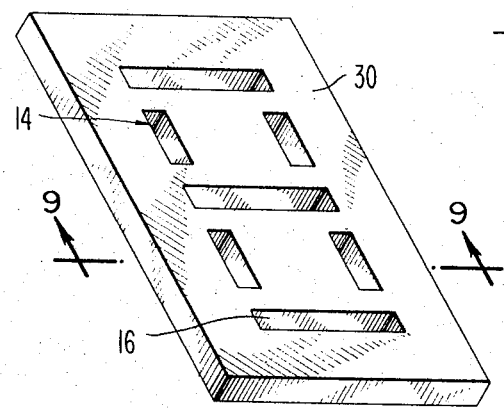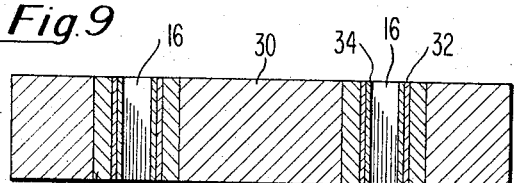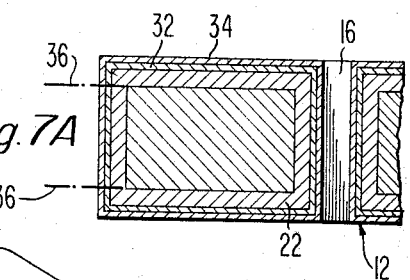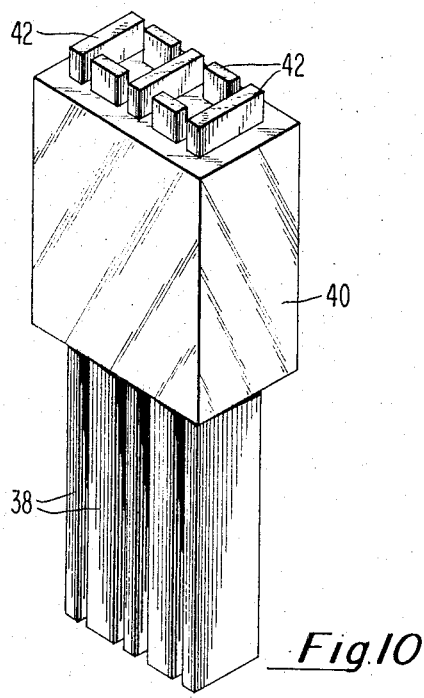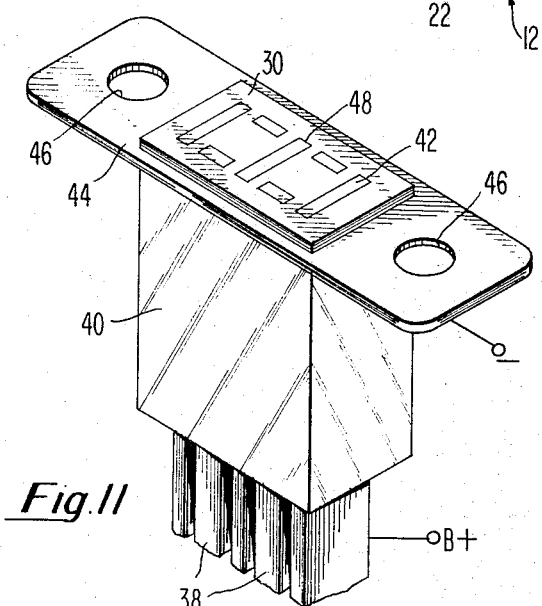
INVENTORS.
FREDERICK F. OHNTRUP
JOSEPH L. McLAUGHLIN
ROBERT E. BENN
Carl Fissell Jr
AGENT

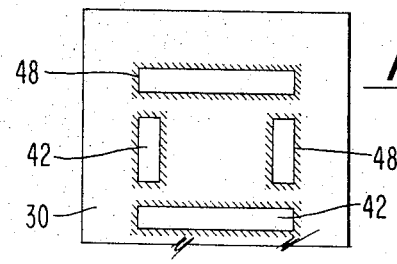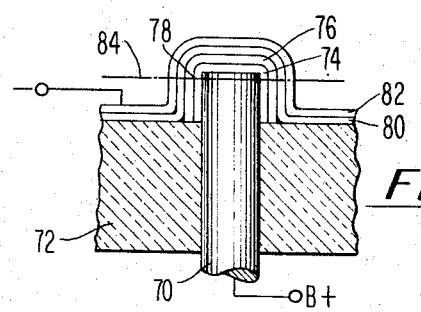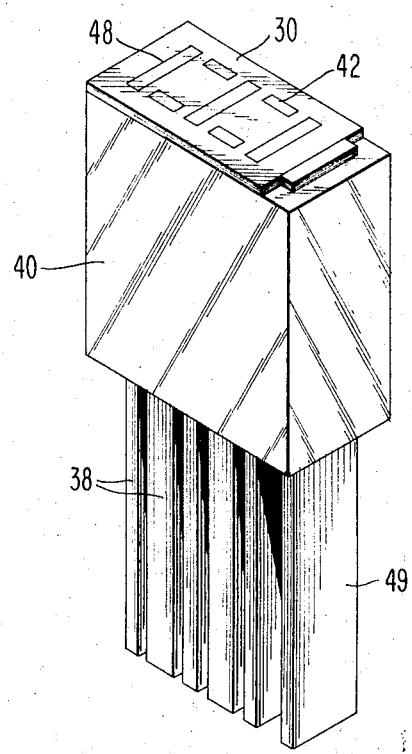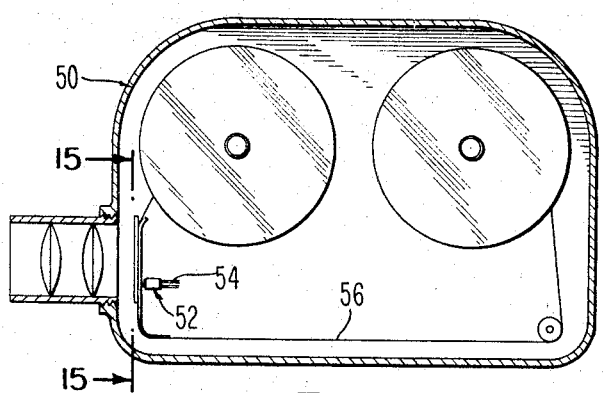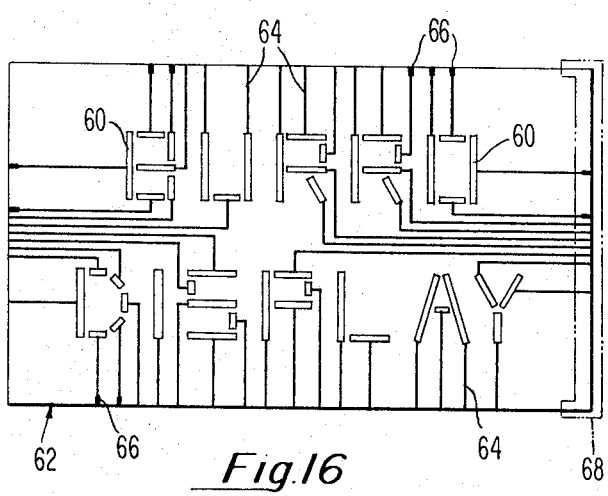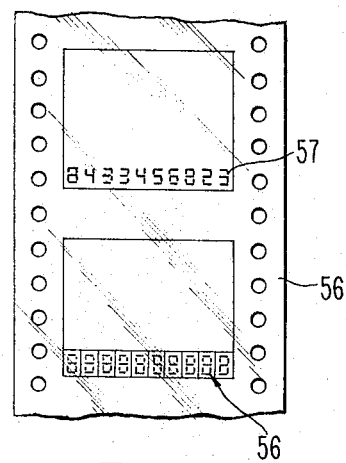

3,354,342
SOLID STATE SUB-MINIATURE DISPLAY
APPARATUS
Frederick F. Ohntrup, Plymouth Meeting, Joseph L. McLaughlin, Springfield, and Robert E. Benn, Boromall, Pa., assignors to Burroughs Corporation, Detroit, Mich., a corporation of Michigan
Filed Feb. 24, 1964, Ser. No. 346,967
4 Claims. (Cl. 313—108)

The present invention relates to solid state sub-miniature display apparatus and, more particularly, although not necessarily exclusively, to solid state sublaser display apparatus employing a semiconductor from among the 3–5 or 2–6 compounds. With still more particularity, the invention has to do with a solid state visual display apparatus useful in recording and/or viewing environments. With still greater specificity the invention deals with semiconductor visual display apparatus useful in high speed photographic recording techniques for producing an instantaneous record of events. Or, for example, in large scale visual display apparatus such as read out displays for electronic computers.

It is an important object of the present invention therefore to provide a new and novel fabricating technique and method for producing a solid state sub-miniature sub-laser display apparatus.

Still another object of the invention is to provide a method and apparatus for producing light emission from forward biased diodes of semiconductors from the 3–5 and 2–6 compounds.

Another object of the invention is to provide a means for incorporating a semiconductor, visual display apparatus in a photographic recording and/or visual display system.

An additional object of the invention is the provision of a solid state sublaser display device in which the viewable area is the semiconductor junction itself thus avoiding the attenuation problems attendant with certain semiconductors which are nontransparent in degree to their own radiation.

In accordance with the foregoing objects and first briefly described, the present invention comprises an article of manufacture and the method for producing the article wherein a semiconductor material such for example as Gallium Arsenide or Gallium Phosphide from the semiconductor compounds 3–5 and 2–6 is divided into a wafer which is thereafter ultrasonically or otherwise machined to provide a plurality of thru slots or apertures arranged in a desired configuration to form, for example, a matrix. The wafer is thereafter diffused with material of the opposite conductivity type to provide a junction area adjacent and contiguous with each of the apertures or slots. The wafer is next cut into a plurality of pieces and machined to remove the junctions from all but the slotted areas. Thereafter, the wafers are metallized with gold by evaporation and then hydrogen alloyed and finally provided with an electroless nickel coating; portions of which are removed to provide conductive areas adjacent to each of the slots. Electrically conductive contacts are thereafter connected to each of the slots and an ohmic contact is made to the base or bulk material thereby providing a display apparatus wherein it is possible with the application thereto of a suitable potential to cause each one or all of the slotted junction areas to glow visibly.

An additional aspect of the subject display device is the application of the herein described method and article to recording techniques wherein one or more of the sub-miniature solid state displays are or may be disposed within the light tight area of a camera adjacent the film gate and close to the photographic film. Thereby incorporating the display as part of a recording camera of the type which may be used to record instantaneous changes or variations in events.

An additional aspect of the invention in accordance with the foregoing objects is the provision of a solid state display wherein the semiconductor material is fabricated to provide individual elemental junctions which are then disposed in contact with a printed wiring conductive matrix array which may be pluggably associated with other utilization devices—for example as the read out portion of an electronic computer.

Other objects and advantages of the present invention will become more readily apparent from the following detailed description of the novel fabrication techniques and the resulting article formed thereby when taken in conjunction with the subject specification and claims together with the appended drawings in which:

FIGURE 1 is an isometric view of a quantity of bulk material used with the present invention;

FIGURE 2 is an isometric view of the bulk material sawed into slabs or wafers;

FIGURE 3 is an isometric view of a single wafer of FIGURE 2;

FIGURE 4 is an isometric view of a single wafer ultrasonically machined to form matrices in accordance with the teaching of the present invention;

FIGURE 5 is a view of an evacuated glass ampoule including the machined wafer and the diffusion material in accordance with the teaching of the present invention;

FIGURE 6 is a section taken along the line 6—6 of FIGURE 5;

FIGURE 7 is an isometric view of the wafer showing the areas to be removed therefrom;

FIGURE 7A is a sectional view along the line 7A—7A of FIGURE 7;

FIGURE 8 is an isometric view of an individual matrix separated by the saw cuts shown in FIGURE 7;

FIGURE 9 is a sectional view along the line 9—9 of FIGURE 8;

FIGURE 10 is an isometric view of the connection device with the electrical conductors therefore disposed in a dielectric support;

FIGURE 11 is a view showing the conductors of FIGURE 9 attached to the display device;

FIGURE 12 is a partial plan view of the matrix of FIGURE 8 showing the viewable junction areas of the matrix;

FIGURE 13 is a view of a further modification of the display device of the present invention;

FIGURE 14 is a view illustrating the arrangement of the display device of the present invention adjacent to photographic recording film in a recording camera;

FIGURE 15 is a view along the line 15—15 of FIGURE 14;

FIGURE 16 is a plan view of a large scale display wherein the semiconductor elements are arranged on printed wiring panels or boards in accordance with the teaching of the present invention; and FIGURE 17 is a sectional view of a portion of a display fabricated in accordance with a modified method and/or technique.

Turning now to the drawings and referring first to FIGURE 1 thereof an example of a piece of bulk material is shown in this view. The block of material 10 is relatively small and is chosen from the 3–5 or 2–6 compounds of elements in the periodic table. Gallium arsenide, silicon carbide, zinc sulphide, zinc selenide or gallium phosphide semiconductor crystal, for example, may be used. The materials are chosen from types of semiconductors wherein the possibility exists of recombination in the junction area, effective to produce electroluminescence i.e. because the band gap is in the visible region of the spectrum the junction emits light. In the case of gallium arsenide, it is in the near infrared region and invisible to the human eye. Gallium phosphide is in the orange region and visible while zinc sulphide is in the blue region as is silicon carbide. Preferably, the material is single crystal since this enables the production of a diode with excellent forward to back ratios e.g. gallium arsenide. The radiation or emission is only from the junction and through the bulk material. Hence, the material is said to be transparent to its own radiation. The substantially rectangular block of material 10 is sawed as by a diamond saw or other similar apparatus into thin elongated wafers 12 roughly 20 mils thick by ¼" wide by ½" long as shown more particularly in FIGURE 2.

Each wafer 12 is thereafter cleaned after which the wafer is secured in an ultrasonic apparatus so that a series of accurately arranged and ordered slots or apertures 14 .008" wide extending through the wafer from one surface to the other are cut therein. The ultrasonic operation is performed with one unitized tool to form a 7 bar matrix, after which the tool is indexed to the next machining position. The pattern in the particular instance herein described is arranged to provide 5 identical matrices each matrix comprised of 7 slots 16. The slots 16 are arranged to enable the display of certain desired symbols such as Arabic numbers. Thereafter each ultrasonic machined wafer is disposed in an ampoule 18 e.g. quartz tube together with a small quantity of material such as zinc 19 effective as a diffusant. The unsealed ampoule is evacuated and then sealed closed at opposite ends 20. The ampoule 18 is placed in an oven and the temperature is raised to approximately 900° C. Diffusion takes place on the order of from one to two hours. As seen in FIGURE 6 the gallium phosphite wafer 12 is thereby provided with a junction 22 from 1 to 2 mils deep extending inwardly into the bulk material from each slot.

The gallium phosphide matrix wafer 12 is next cut into one or more matrices depending on size generally along horizontal and vertical lines 24 and 26 as shown in FIGURE 7 wherein all of the outer edge portions 28 are removed so that the junction between bulk material and the diffused material extends only in the area adjacent to the slots 16 of each matrix.

As seen in FIGURE 9 each matrix 30 (90 x 140 mils) is then metalized with gold 32 by placing the matrix in an evaporation chamber and evaporating gold to a suitable thickness all over the surface including the slots thereof. The individual matrix 30 is next hydrogen alloyed to alloy the gold layer into the material. Thereafter the matrix is provided with an electroless nickel coating 34. This coating as before completely surrounds the matrix including the areas provided by the slots. The matrix 30 is next lapped on its obverse and reverse flat planar surface to a depth 36 sufficient to cut away the common conductive coating provided in the previous steps and below the surface junctions.

A series of electrical conductors 38 FIGURE 10 are next provided, which in the present example take the form of flat, planar elongated strips of conductive material such for example as brass, beryllium copper or nickel. The thickness, length, strength and composition of the individual pieces is a matter of design choice depending on how the conductors are to be affixed to the matrix 30. In the example presently under consideration a header 40 of dielectric material formed as by casting, milling, molding, etc. provides a support by means of which each of the conductors 28 is arranged to be received in adjacent, spaced apart non-touching relationship with its neighbor conductor as shown in FIGURE 10. The upwardly extending ends 42 of the conductors 38 i.e. that portion of each conductor which extends above the header material 40 is solder coated. The matrix 30 then received over the header 40 so that each conductor matingly engages the wall of its respective slot 16, after which heat is applied to bond the conductor 38 to the wall of its associated slot 16. The material 42 extending above and away from the upper surface of the matrix 30 if any is then cut away to make as smooth and highly polished a surface as possible. An ohmic connection is made to the bulk material of the wafer by a flat planar conductive clip member as seen more particularly in FIGURE 11 and the wafer is bonded thereto by alloying or soldering. The opposite ends of the clip 44 are provided with attachment holes 46 through which attaching screws or bolts (not shown) may be inserted for securing the display apparatus to other utilization equipment as will be described more particularly hereinafter.

Suitable potentials may now be applied between the common or ohmic connector 44 and the individual conductors 38 disposed within their associated slots, so that one or more or all of the junctions 48 FIGURE 12 can be made to luminesce or glow. The chosen potential being sufficient to cause radiative recombination and therefore light emission at the junction 48 as seen in the partial plan view of FIGURE 12.

The mechanical arrangement of the display of FIGURE 11 may prove too bulky for certain applications. In this case, the construction of FIGURE 13 is more desirable. Here, the header 40 which as before may be a suitable dielectric is provided with an additional conductor 49 which is secured as by soldering to the bulk material 30 at one end thereof along the edge portion. This provides a much neater packaging of the display apparatus and for purposes which follow hereinafter lends itself to high packing density and close center-to-center spacing in relatively cramped quarters.

Because of its small size and effective light output the indicating semiconductor hereinabove described has many useful applications. One of the more important of such applications is in a high speed recording camera as a means for exposing photographic film at relatively high speeds and without the necessity for stopping the movement of the film to make the exposure. One such arrangement is shown in FIGURES 14 and 15. Referring first to FIGURE 14 there is shown a motion picture camera 50 of conventional type, wherein a plurality of the indicating semiconductor devices 52, as disclosed by the present application, are seen to be incorporated. The individual displays 52 may be stacked in a side by side arrangement or in any suitable grouping with their leads 54 bundled together in the form of a cable which extends away therefrom for atachment to suitable potential supplying apparatus such for example as a battery and a switch, not shown. As shown more particularly in the plan view of FIGURE 15 such light output devices 52 are shown disposed adjacent to a strip of motion picture film 56 and arranged so that the film passes before the bank of 10 indicators in a manner permitting the light from the glowing junction to expose the film 56 providing an image thereon or e.g. a series of Arabic numerals 57.

This material possesses the ability to be driven from extremely low voltages e.g. transistor circuits, not possible with other high speed displays. Thus the application of a signal potential of 2 volts at 200 milliamps will illuminate any junction adequately. If short high current pulses are applied as for example 10 to 20 amps for 5 to 10 microseconds photographic records can be made which are suitable for viewing and the film may be run there past at extremely high speeds without stopping. These devices have the capability of operation in the neighborhood of 1000 megacycles. Such applications lend themselves to high speed photography as practiced in missile launching and tracking cameras etc. An "on-off" time of 5 microseconds avoids blurring. Such a device as that disclosed herein provides a means for indicating the exact time that the frame was exposed, particularly where it is necessary in missile firing etc., the time being indicated to the nearest millisecond.

The present invention also is useful in providing a so called visual display such as is often used as an output device with the electronic computation apparatus. In this case, the individual semiconductor junctions would be fabricated in the form of, for example, individual bars 60 in FIGURE 16 in a manner such that the entire bar of semiconductor material would glow with a reasonably high degree of illumination forming in glowing lines of light information which could be Alpha-numeric or other types of symbol information necessary or useful in computation.

One such arrangement for the latter display is shown in FIGURE 16 wherein an epoxy board 62 for example, or other suitable dielectric is provided with a series of conductive lines 64 and/or circuit connecting elements or pads 66 to which or by means of which individual semiconductor bar-like elements 60 may be attached as by gluing thereto and/or soldering. Each bar has its own individual set of contact elements including the common ohmic contact and the arrangement of semi-conductors on the dielectric member is relatively limitless—the actual permutations and combinations available being limited by the imagination of the user. In use the printed wiring board 62 is or may be pluggably mounted in a printed wiring connector 68 for attachment to other associated circuitry. Such a device as the foregoing has many useful applications not only those for computers but in any environment where individual elements of communication are desired to be displayed or wherein whole words or numbers are necessary or useful. The materials forming the basis of the semiconductor display vary but remain within the range of combinations of 3–5 and 2–6 in the periodic table.

In order to further simplify the "set up" required to fabricate the matrices as hereinabove set forth a simpler method is that hereinafter described.

A plurality of conductors such as conductors 38 or just plain round wires 70 FIGURE 17 are disposed in a header 72 of high heat resistant material e.g. ceramic which is held in a fixed jig (not shown) to provide correct and adequate spacing and viewing arrangement. Semiconductor material of one conductivity type 74 e.g. (N or P) is then sputtered over the conductor wires. Thereafter semiconductor material of an opposite conductivity type 76 e.g. (P or N) is sputtered over the same wires so as to form a junction 78 between the two semiconductor types. A conductor 80 e.g. gold flash is next evaporated over the uppermost surface formed by the second semiconductor 76 after which a conductive material 82 e.g. electroless nickel is electroplated over the entire area of the conductors so as to short out all the outer edges. The surface of the assembly is next lapped down along the line 84 with the result that the inner sputtered areas are electrically insulated from the outer areas but all the outer ones are essentially interconnected. The end result is an article of manufacture, a display, similar to the one hereinbefore described. Electrical potentials may be applied between the conductors 70 and the nickel coating 82 causing the junctions 78 of each conductor to glow. By suitably arranging the pins 76 in a 5+7 matrix alpha numeric symbols may be displayed with ease, low voltage and efficiency.

The present print and or record head can be utilized with photosensitive papers in much the same manner as the cathode ray tube is used with such recording media. In this manner there is provided an extremely efficient and relatively inexpensive high speed printer.

It is apparent of course that color may be desirable. If necessary, changes in the semiconductor bulk material may be made to afford the desired color or hue. It is also apparent that certain semiconductors are transparent, to their own radiation while others are semitransparent or translucent thereto. These considerations obviously will make one or the other of the semiconductor bulk materials more desirable. In any event, this should not be considered a limitation on the disclosed invention but simply an added feature thereof.

What is claimed is:
1. Semiconductor electroluminescent display apparatus comprising,
   (a) an array of electrical conductors arranged in a pattern characteristic of intelligence,
   (b) said conductors having an overlay of a semiconductor material of one conductivity type (N or P),
   (c) an opposite conductivity type semiconductor material (P or N), forming a recombination junction at the interface between the two conductivity types,
   (d) a conductor overlay on said material providing a good ohmic contact to the second mentioned conductivity type material,
   (e) the surface of said conductors being lapped smooth thereby removing the shorting overlay material and exposing the recombination junctions at each conductor, and
   (f) means for applying suitable electrical potentials between said conductors and said overlay material effective to cause recombination to occur in said junctions producing a visible pattern characteristic of said intelligence.

2. Semiconductor electroluminescent display apparatus comprising,
   (a) an array of electrical wire-like conductors arranged in a matrix pattern characteristic of intelligence in a header of high heat resistant material,
   (b) semiconductor material of one conductivity type (N or P) disposed on said wire-like conductors,
   (c) semiconductor material of an opposite conductivity type (P or N) disposed on the first named semiconductor material forming a recombination junction at the interface between the two conductivity type materials,
   (d) a conductor overlay on said conductors providing a good ohmic contact to the first mentioned conductivity type material,
   (e) the surface of said conductors being lapped thereby removing the shorting overlay material and exposing the recombination junctions at each conductor, and
   (f) means for applying suitable electrical potentials between said conductors and said overlay material effective to cause recombination to occur in said junctions producing a visible pattern characteristic of said intelligence.

3. A method for producing semiconductor electroluminescent display apparatus comprising the steps of,
   (a) providing an array of electrical conductors arranged in a pattern characteristic of intelligence in a header of high heat resistant material,
   (b) sputtering on said conductors semiconductor material of one conductivity type (N or P),
   (c) sputtering on the first sputtered semiconductor material a layer of semiconductor material of an opposite conductivity type (P or N), forming a recombination junction at the interface between said conductivity types,
   (d) providing said conductors with a conductor overlay enabling a good ohmic contact to be made to the first conductivity type material, (e) applying an electroless nickel coating over said conductors so as to short out the outer edges of said conductors, (f) lapping the surface of said conductors thereby removing the shorting overlay material and exposing the recombination junctions at each conductor, and (g) providing means for applying suitable electrical potentials between said conductors and said overlay material effective to cause recombination to occur in said junctions producing a visible pattern characteristic of said intelligence.

4. A method for producing semiconductor electroluminescent display apparatus comprising the steps of, (a) providing an array of electrical conductors arranged in a pattern characteristic of intelligence, (b) sputtering on said conductors semiconductor material of one conductivity type (N or P), (c) sputtering on said conductors semiconductor material of an opposite conductivity type (P or N), forming a recombination junction at the interface between said conductivity types, (d) providing said conductors with a conductor overlay enabling a good ohmic contact to be made to the first conductivity type material, (e) lapping the surface of said conductors thereby removing the shorting overlay materials and exposing the recombination junctions at each conductor, and (f) providing means for applying suitable electrical potentials between said conductors and said overlay material effective to cause recombination to occur in said junctions producing a visible pattern characteristic of said intelligence.

References Cited

UNITED STATES PATENTS

| | | | |
|---|---|---|---|
| 2,776,367 | 1/1957 | Lehovec | 317—234.27 |
| 3,013,955 | 12/1961 | Roberts | 317—234.5 |
| 3,020,412 | 2/1962 | Byczkowski | 317—235.27 |
| 3,044,909 | 7/1962 | Shockley | 148—187 |
| 3,188,475 | 6/1965 | Miller | 250—211 |
| 3,214,654 | 10/1965 | Armstrong | 317—234.11 |
| 3,219,865 | 11/1965 | Vodicka | 313—108 |
| 3,234,440 | 2/1966 | Marinace | 29—155.56 |
| 3,246,193 | 4/1966 | Dickson | 313—108 |
| 3,270,399 | 9/1966 | Ohntrup | 29—155.56 |
| 3,293,513 | 12/1966 | Biard et al. | 313—108 |
| 3,302,051 | 1/1967 | Galginaitis | 313—108 |
| 3,308,452 | 3/1967 | Michel et al. | 315—169 |

OTHER REFERENCES

Fisher, "Injection Electroluminescence," Solid-State Electronics, vol. 2, 1961, pages 232–242.

JAMES W. LAWRENCE, *Primary Examiner.*

R. JUDD, *Assistant Examiner.*